United States Patent [19]

Rogers

[11] 4,340,437
[45] Jul. 20, 1982

[54] METHOD OF PRODUCING A MOISTURE-INSENSITIVE MOLDED LEATHER HOLSTER

[75] Inventor: William H. Rogers, Jacksonville, Fla.

[73] Assignee: Rogers Holster Co., Inc., Jacksonville, Fla.

[21] Appl. No.: 129,174

[22] Filed: Mar. 10, 1980

[51] Int. Cl.$^3$ .......................... B29C 19/00; B29F 1/10; B29F 25/00; A45C 1/00

[52] U.S. Cl. ..................................... 156/224; 156/245; 264/516; 264/522; 264/DIG. 57; 150/34

[58] Field of Search ............... 224/243, 911, 193, 200, 224/260; 156/245, 305, 224, 306.6, 294; 2/250; 36/9 R, 44; 264/516, 267, 521, 269, 522, 554, 271, DIG. 57, DIG. 80, 292, 299, 322; 150/34, 116; D22/14; 69/21

[56] References Cited

U.S. PATENT DOCUMENTS

| | | | |
|---|---|---|---|
| 2,328,798 | 9/1943 | Gardner | 264/269 |
| 2,369,943 | 2/1945 | Broudy | 150/34 |
| 2,685,572 | 8/1954 | Perkins | 156/320 |
| 3,232,813 | 2/1966 | Newton | 156/320 |
| 3,797,715 | 3/1974 | Scialdone | 224/911 |
| 3,902,639 | 9/1975 | Rogers | 224/243 |
| 4,044,929 | 8/1977 | Caruso | 224/911 |
| 4,190,183 | 2/1980 | Yates | 224/911 |
| 4,225,067 | 9/1980 | Bianchi et al. | 224/243 |

OTHER PUBLICATIONS

American Rifleman, Feb. 1970, p. 59, Am. Rifleman.

*Primary Examiner*—Edward C. Kimlin
*Assistant Examiner*—L. Falasco
*Attorney, Agent, or Firm*—Arthur G. Yeager

[57] ABSTRACT

A method of producing a molded leather holster capable of holding the holstered item in the holster by friction or pressure due to the molding and which is capable of retaining its molded shape in the presence of moisture, the method comprising preparing a laminate of at least one layer of leather and a layer of a heat moldable thermoplastic material, heating the laminate to the molding temperature of said thermoplastic material, inserting a forming core inside said holster and applying pressure from the outside of said holster while said temperature is reduced to a level below the molding temperature.

21 Claims, No Drawings

METHOD OF PRODUCING A MOISTURE-INSENSITIVE MOLDED LEATHER HOLSTER

BACKGROUND OF THE INVENTION

This invention relates to a method of producing a moisture-insensitive molded leather holster capable of holding a sidearm or other holsterable item in the holster without the necessity for keeper straps, fasteners, or the like.

Sidearms are normally carried in a leather holster mounted on a waist belt or on a shoulder harness depending upon the desires of the user. The holster should be capable of holding the sidearm or the like and yet readily releasing it when the user wishes it. These two requirements are somewhat conflicting in that the user may wish to draw the sidearm quickly when it is needed but, on the other hand, wishes it to be held securely in the holster until it is needed. In the past holsters have been equipped with cover flaps, restraining straps, snaps, and other types of safety latches which hold the sidearm in the holster without regard to the movements and activities of the user or the positioning of the holstered item. The only difficulty with such keeper means is that they must be unfastened before the holstered item can be removed and such a delay in time may be critical to the user.

Many attempts have been made to mold the leather of the holster to fit the implement being holstered, e.g. a sidearm, by molding the leather to fit the holstered item. The leather is adaptable to molding operations and takes the shape, in general, of the holstered item without difficulty, but the shape disappears when the holster is subjected to moisture. There have been other attempts to avoid this difficulty with leather by attempting to make holsters from moisture-insensitive materials such as metal, plastic, etc. While this may solve the problem of shape retention it is not acceptable to the user because the feel, wearing comfort of and other desirable qualities of leather cannot be substituted with other materials.

In my copending patent application Ser. No. 954,351 filed Oct. 25, 1978 U.S. Pat. No. 4,286,741, there is a disclosure of a front opening holster made of a laminate of a thick central layer of plastic and two thin outside layers of leather. This holster has a molded shape to conform generally to the shape of the sidearm carried in the holster, but it will not permit the sidearm to be withdrawn in any direction except from the front opening. The molded sides of this holster are rigid, and it is only by flexing the back seam of the holster that the three open sides will spread apart enough to permit the weapon to be withdrawn.

It is an object of this invention to provide a leather holster which is molded to fit the contours of the holstered item and thereby provide means for retaining the holstered item in the holster by friction alone, and at the same time, to provide a holster which retains its molded shape in the presence of moisture. It is another object of this invention to provide such a holster for a sidearm. It is still another object of this invention to provide such a holster for other holsterable items such as handcuffs, tools, etc. Still other objects will appear from the more detailed description of this invention which follows.

BRIEF SUMMARY OF THE INVENTION

This invention provides a method for producing a moisture-insensitive molded leathered holster comprising preparing a laminate of at least of one layer of leather and a layer of heat moldable theremoplastic material and producing a molded leather holster by heating said laminate to the molding temperature of said theremoplastic material, inserting a forming core inside said holster, and applying pressure from the outside of said holster while said temperature is reduced to a level below said molding temperature. In a specific embodiment of this invention the laminate comprises an outside and an inside sheet of leather laminated to a central sheet of thermoplastic material, preferably by the assistance of a nitrile rubber base adhesive applied between the sheet of thermoplastic material and each sheet of leather.

DETAILED DESCRIPTION OF THE INVENTION

The method of this invention involves three process steps:

(1) the preparation of the laminate of leather and a thermoplastic material;

(2) the fabrication of the laminate into a holster; and (3) the molding of the holster into the desired shape.

The first step involving the preparation of the laminate requires that a tight bond be achieved between at least one layer of leather and a layer of thermoplastic heat moldable material. In some instances it will be sufficient to employ a single layer of leather bonded to a single layer of plastic material. Holsters made from such a laminate would presumably have an interior surface resulting from the thermoplastic layer and an exterior surface of leather although there is nothing to prevent the opposite arrangement, i.e. interior surface of leather and an exterior surface of plastic if the user so desires. In most instances, however, particularly with respect to holsters for sidearms, the laminate will be comprised of two outside layers of leather and a central layer of plastic. Such a laminate would then produce a holster having an interior lining of leather and an exterior surface of leather with the central layer of plastic being completely hidden from view. Such a three-layered construction is preferable in a sidearm holster since it provides a nonabrasive surface next to the sidearm, and a smooth outer surface which is comfortable for the user to wear, is nonabrasive, and has a desirable appearance. A particularly advantageous feature of this invention is that the outer layer of leather may be made from the less expensive leather, such as belly leather as distinguished from leather from the shoulder or the back, which is desirable because of its strength. The softer belly leather is suitable in this use because the heat moldable plastic layer provides the necessary strength. The inner layer of leather in this holster is normally made of inexpensive split lining leather as has been the case with most holsters of the prior art.

Another advantageous feature of this invention is that the outer layer of leather can be made from a less expensive material because of the novel construction of this laminate. In the past chrome-tanned leather was not suitable as a holster material for polished metal sidearms because the chrome salts employed in the tanning process eventually leached out and caused corrosion of the metal in the sidearm. The more expensive oak-tanned leather was necessarily employed for holster material to prevent the possibility of such corrosion. In the present invention the central layer of thermoplastic material is a barrier through which chrome salts cannot pass and thus there is no possibility for corrosion of the sidearm to occur when chrome-tanned leather is employed as the outer layer of the holster laminate.

The central layer is a heat moldable thermoplastic material. Such materials are commercial available in sheet form in any of a variety of thickness. Each type of material has its own unique molding temperature, frequently known as the "softening temperature", at which level the sheet can be caused to assume any irregular shape. If that shape is held until the temperature is reduced the sheet will retain that irregular shape. Among the materials which are suitable for this purpose are polystyrene, acrylic-butadiene-styrene terpolymer, polyvinyl chloride, polyvinyl chloride-acrylic copolymer, polyvinyl butyrate, and polycarbonate. There may be other thermoplastic sheet materials which are also suitable in this invention although the preferred types are listed above.

The molding temperature of the thermoplastic material must be below the temperature which causes any destruction of the leather in the laminate. Generally this temperature is about 400° F. For the most part the molding temperatures of such thermoplastic sheet materials is above about 175° F.

The thickness of the thermoplastic sheet material which is employed is not a critical limitation although it should be recognized that for larger and stronger holsters a thicker sheet material should be employed and for smaller more flexible holsters a thinner sheet material may be employed. As an overall range it may be said that the thermoplastic sheet material should have a thickness of about 0.010–0.060 inch, and for most holster applications this thickness is preferably 0.020–0.040 inch.

The actual process of lamination is normally accomplished by applying a suitable adhesive to the layers to be laminated, assembling the layers, and applying heat and pressure. Many of the thermoplastic materials available today are capable of sealing to themselves or to other materials by the application of heat and pressure alone but none are known to provide a well bonded laminate to leather without the assistance of an adhesive. Any adhesive is suitable which results in a bond that is somewhat flexible, i.e. not so rigid as to crack upon the slightest stress applied to the laminated layers. A preferred adhesive for this invention is a nitrile rubber base cement which is soluble in ketones such as acetone or methyl ethyl ketone. This solvent may be employed to prepare the laminate in either of two acceptable methods. In one procedure the layers to be laminated are coated evenly and completely with the liquid adhesive, immediately pressed together, and allowed to dry. In a second procedure the layers to be laminated are coated evenly and completely with the liquid adhesive and the coated layers are allowed to dry without being joined to each other. Subsequently the dry coated layers are arranged in the desired order and subjected to heat and pressure to activate the dried adhesive and thereby to produce the necessary bonding. In the process of this invention the latter of these two alternatives is desired if one wishes to apply a metallic snap or other fastener elements to the laminate because it is much easier to handle the dried layers. Except for this fabrication advantage these two procedures are equally acceptable.

The second principal step in the process of this invention is the preparation of the holster from the laminate. This is generally accomplished by cutting two pieces of the laminate to the desired shape and joining these two pieces around a portion of their peripheries to produce the desired holster. Normally in holsters for sidearms the method of joining the two pieces of laminate is by stitching. Other means of joining, e.g. riveting, stapling, cementing, and the like, are acceptable for various embodiments of this invention. The holster may take on any of several shapes and therefore the portions of the peripheries to be joined will vary depending upon the shape and size of the sidearm or other holsterable item.

The third step in the process is that of molding the holster into the desired shape. This is accomplished by heating the holster so that the thermoplastic layer will reach a molding temperature or 175° F.–400° F., applying external pressure against an internal shaped core to cause the laminate to assume the general shape of that core, and cooling the temperature while maintaining that pressure to cause the thermoplastic layer to assume the permanent shape produced by the molding. Depending upon the severity of the processing conditions and the exact thickness and types of the materials in the laminate the molding operation may produce a holster which fits so tightly around the holstered item that it cannot be removed by ordinary manual operations, or the result may be in the other extreme whereby the shaping is too loose and sloppy to contain the holstered item. Since the theromplastic layer has the characteristic of being softened by the application of heat, an unsuccessful first attempt at molding the holster to the desired contour can be remedied by repeating the operation after altering the shape of the core to accomplish the desired result. If the first attempt produces a holster that is too tight around the holstered item the core should be reshaped to remove sharp corners and protuberances that would prevent easy withdrawal from the holster or to add a small amount to the size of the core. If the first attempt produces a holster that is too loose, the opposite direction in reshaping the core should be undertaken.

Preferably this operation is accomplished by heating the unmolded holster to the desired temperature, e.g. 250° F.–300° F. to cause the holster to be in a soft pliable condition. At this point there is inserted into the holster opening which will eventually contain the holsterable item, the item itself or a suitable facsimile as a core. It is then necessary to apply sufficient pressure to the outside of the holster against the core to cause the laminate to assume the shape desired. When this is accomplished, it is merely necessary to permit the temperature of the holster to be reduced substantially below the molding temperature to a level at which the thermoplastic layer will retain the molded shape. Generally this temperature is not above about 100° F.–150° F.

The pressure may be applied to the outside of the holster during this operation by any convenient means. One of such is by using opposing pads of hard foamed rubber i.e. having a Durometer hardness of about 40–70. Another means is to employ two opposing concave metallic shapes which generally conform to the desired outside contour of the holster. The latter means is preferable in that it permits rapid cooling because of the high thermal conductivity of metal, even though it may be a more expensive procedure than that of employing the foamed rubber pads.

Each holsterable item which is employed with a holster of this invention must be inspected and analyzed to determine which contours or component parts of the item whould be given special attention as pressure points in the molding operation, so as to produce corresponding contours in the inside of the holster to serve as friction locks to keep the item in the holster. The first time a holster is prepared in accordance with this invention to retain a specific item it may be necessary to experiment with more than one pressure point and to vary the amount of pressure to be employed so as to produce a holster that provides desired retention and release characteristics for the holsterable item. In the case of a sidearm it is frequently suitable to employ as pressure points the safety catch, the cartridge ejection port, a ridge on the cylinder of a revolver, the trigger guard, etc. With respect to handcuffs it is convenient to employ the inside surface of the handcuffs as a pressure point. With respect to hand tools, instruments, or the like, which might be holstered, suitable corners, ridges, protuberances, and the like can readily be found to serve as the pressure point or points which will be translated by molding into the frictional locks for retaining the item in the holster.

While the invention has been described with respect to certain specific embodiments it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States:

1. A method of producing a moisture-insensitive molded leather holster having a closed front and back and an open top and a fully lined leather cavity for a holsterable object comprising preparing a laminate of at least one layer of leather integrally bonded to a layer of heat moldable thermoplastic material, and producing a leather holster heating said holster to the molding temperature of said thermoplastic material, opening said open top of said holster and inserting a forming core having a shape conforming to the holsterable object through said open top to lie between said front and back within said fully lined leather cavity of said holster, applying pressure from the outside of said holster to closely mold said laminate to said forming core while said temperature is reduced to a level below said molding temperature, and forcibly removing said forming core from said cavity out said open top of said holster to break said core away from friction contact points between said core and said laminate forming said cavity.

2. The method of claim 1 wherein said laminate comprises two outer layers of leather and a central layer of thermoplastic material.

3. The method of claim 1 wherein said laminate comprises two outside sheets of leather and a central sheet of thermoplastic material with a layer of adhesive between each sheet of leather and said central sheet of thermoplastic material.

4. The method of claim 3 wherein said adhesive is a nitrile rubber base material.

5. The method of claim 1 wherein two side forming pieces of said laminate are joined to each other around a portion of their peripheries to produce said closed front and back of holster prior to being subjected to heating and molding.

6. The method of claim 5 wherein said two pieces of laminate are stitched to each other.

7. The method of claim 1 wherein said pressure is applied by means of opposed pieces of hard foamed rubber.

8. The method of claim 1 wherein said pressure is applied by means of two shaped, opposed, concave, metal surfaces conforming to the outside shape of the molded holster.

9. The method of claim 3 wherein said laminate is prepared by applying liquid nitrile rubber base adhesive between said central sheet and each of said two outer sheets of leather and pressing the laminate until the adhesive has dried.

10. The method of claim 3 wherein said laminate is prepared by applying liquid nitrile rubber base adhesive to both surfaces of said central sheet and to the laminating surface of each of said two sheets of leather, permitting all three adhesive-treated sheets to dry, and thereafter assembling the three sheets to form the intended laminate, applying heat and pressure and recovering the laminate.

11. The method of claim 10 wherein a fastener component is incorporated into one or more of said three sheets just prior to the final laminating by heat and pressure.

12. A method of producing a moisture-insensitive molded leather holster for frictionally engaging an irregular object comprising preparing an integrally bonded laminate of at least one layer of leather, a layer of adhesive, and a layer of heat moldable thermoplastic material, forming from said laminate a holster having a closed front and back and an open top and an interior fully lined leather pocket with said laminate being on both sides of said pocket, heating said holster to the molding temperature of said thermoplastic material, opening said open top of said holster and inserting a forming core conforming to said irregular object through said open top and into said pocket, applying pressure from the outside of said holster while said temperature is reduced to a level below said molding temperature whereby said pocket conforms to said core, and forcibly removing said core by breaking said core away from friction contact points formed in the holster to inhibit inadvertent removal of said irregular object from said holster.

13. The method of claim 12 wherein said laminate comprises two outer layers of leather and a central layer of thermoplastic material.

14. The method of claim 12 wherein said laminate comprises two outside sheets of leather and a central sheet of thermoplastic material with a layer of adhesive between each sheet of leather and said central sheet of thermoplastic material.

15. The method of claim 12 wherein said adhesive is a nitrile rubber base material.

16. The method of claim 12 wherein said two pieces of laminate are stitched to each other.

17. The method of claim 12 wherein said pressure is applied by means of opposed pieces of hard foamed rubber.

18. The method of claim 12 wherein said pressure is applied by means of two shaped, opposed, concave, metal surfaces conforming to the outside shape of the molded holster.

19. The method of claim 14 wherein said laminate is prepared by applying liquid nitrile rubber base adhesive between said central sheet and each of said two outer sheets of leather and pressing the laminate until the adhesive has dried.

20. The method of claim 14 wherein said laminate is prepared by applying liquid nitrile rubber base adhesive to both surfaces of said central sheet and to the laminating surface of each of said two sheets of leather, permitting all three adhesive-treated sheets to dry, and thereafter assembling the three sheets to form the intended laminate, applying heat and pressure and recovering the laminate.

21. The method of claim 20 wherein a fastener component is incorporated into one or more of said three sheets just prior to the final laminating by heat and pressure.

* * * * *

UNITED STATES PATENT AND TRADEMARK OFFICE
CERTIFICATE OF CORRECTION

PATENT NO. : 4,340,437
DATED : July 20, 1982
INVENTOR(S) : William H. Rogers

It is certified that error appears in the above-identified patent and that said Letters Patent are hereby corrected as shown below:

Col. 5, line 41, after "holster" (first occurrence) insert -- from said laminate to define a holster having a closed front and back and an open top with said laminate being on both sides and defining a fully lined leather cavity --

Signed and Sealed this

Twenty-sixth Day of August 1986

[SEAL]

Attest:

DONALD J. QUIGG

Attesting Officer

Commissioner of Patents and Trademarks